United States Patent
Wong

(10) Patent No.: US 10,945,556 B2
(45) Date of Patent: Mar. 16, 2021

(54) APPLIANCE FOR MAKING BEVERAGES

(71) Applicant: Otter Controls Limited, Buxton (GB)

(72) Inventor: Kwok Hung Wong, Ma On Shan (HK)

(73) Assignee: Otter Controls Limited, Buxton (GB)

( * ) Notice: Subject to any disclaimer, the term of this patent is extended or adjusted under 35 U.S.C. 154(b) by 155 days.

(21) Appl. No.: 16/110,870

(22) Filed: Aug. 23, 2018

(65) Prior Publication Data

US 2019/0059640 A1 Feb. 28, 2019

(30) Foreign Application Priority Data

Aug. 25, 2017 (CN) .......................... 201721080250.6

(51) Int. Cl.
| | | |
|---|---|---|
| *A47J 43/06* | (2006.01) | |
| *A47J 31/10* | (2006.01) | |
| *A47J 31/56* | (2006.01) | |
| *A47J 31/44* | (2006.01) | |
| *A47J 27/00* | (2006.01) | |
| *A47J 31/12* | (2006.01) | |
| *A47J 43/046* | (2006.01) | |

(52) U.S. Cl.
CPC ............ *A47J 31/56* (2013.01); *A47J 27/004* (2013.01); *A47J 31/10* (2013.01); *A47J 31/12* (2013.01); *A47J 31/4403* (2013.01); *A47J 43/046* (2013.01)

(58) Field of Classification Search
CPC ............ A47J 43/06; A47J 43/046–0465; A47J 27/004; A47J 31/10–12; A47J 31/4403; A47J 36/16–165; A47J 2031/165
See application file for complete search history.

(56) References Cited

U.S. PATENT DOCUMENTS

| | | | | |
|---|---|---|---|---|
| 4,747,696 A | * | 5/1988 | McCrory ............. | B01F 7/1675 366/307 |
| 7,217,028 B2 | * | 5/2007 | Beesley .............. | A47J 43/0727 366/199 |
| 2002/0196705 A1 | * | 12/2002 | Jersey ................. | A47J 43/0465 366/274 |

(Continued)

FOREIGN PATENT DOCUMENTS

| | | |
|---|---|---|
| CN | 200990699 Y | 12/2007 |
| EP | 2 033 492 B1 | 12/2013 |

(Continued)

OTHER PUBLICATIONS

Extended European Search report dated Jan. 31, 2019 issued in connection with European Patent Application No. 18190570.4 (8 pages).

(Continued)

*Primary Examiner* — Michael A LaFlame, Jr.
(74) *Attorney, Agent, or Firm* — McCarter & English, LLP

(57) ABSTRACT

An appliance for making beverages comprises a container for liquid, means for creating a rotational movement of the liquid to raise a level of the liquid, and a brewing chamber mounted between a normal level of the liquid, when the means for creating a rotational movement is not rotating, and a raised level of the liquid, when the means for creating a rotational movement is rotating, so that the liquid flows into the brewing chamber when the means for creating a rotational movement is rotating above a predetermined speed.

19 Claims, 10 Drawing Sheets

(56) References Cited

U.S. PATENT DOCUMENTS

| | | | |
|---|---|---|---|
| 2010/0260005 A1* | 10/2010 | Bodum | A47J 43/0465 |
| | | | 366/144 |
| 2012/0167781 A1* | 7/2012 | Lane | A47J 27/56 |
| | | | 99/453 |
| 2015/0201808 A1* | 7/2015 | Katsuki | A47J 43/042 |
| | | | 99/489 |
| 2015/0297027 A1 | 10/2015 | Nespoux et al. | |
| 2015/0342409 A1* | 12/2015 | Lambourn | B01F 7/0025 |
| | | | 366/205 |

FOREIGN PATENT DOCUMENTS

| | | | |
|---|---|---|---|
| GB | 2505659 A | 3/2014 | |
| WO | WO 2008/012506 A1 | 1/2008 | |
| WO | 2016/165454 A1 | 10/2016 | |

OTHER PUBLICATIONS

Intention to Grant Communication Under Rule 71(3) issued by the European Patent Office dated Jan. 10, 2020, including Annex to EPO Form 2004 and Text Intended to Grant, issued in connection with European Patent Application No. 18190570.4 (23 pages).

* cited by examiner

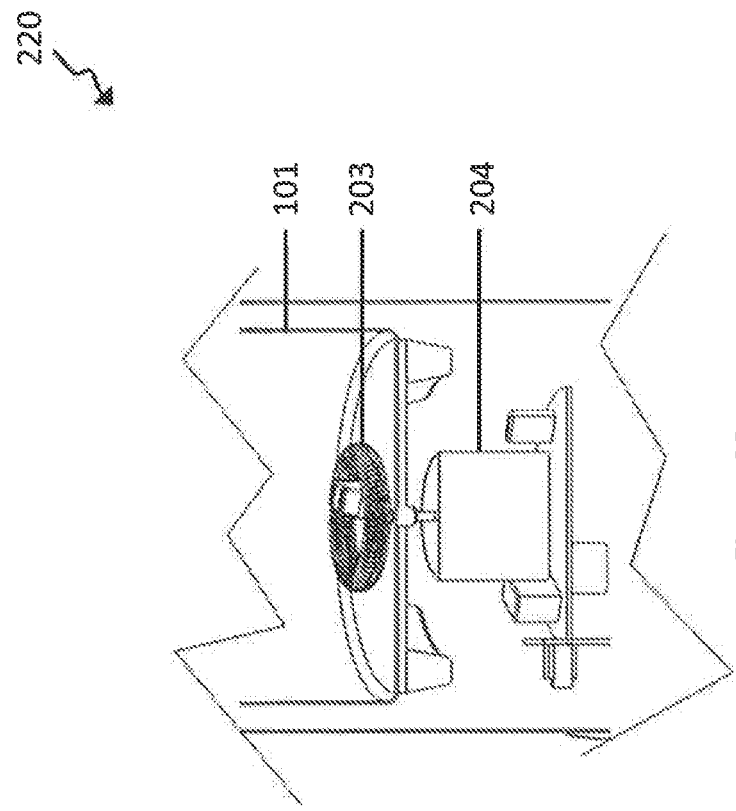
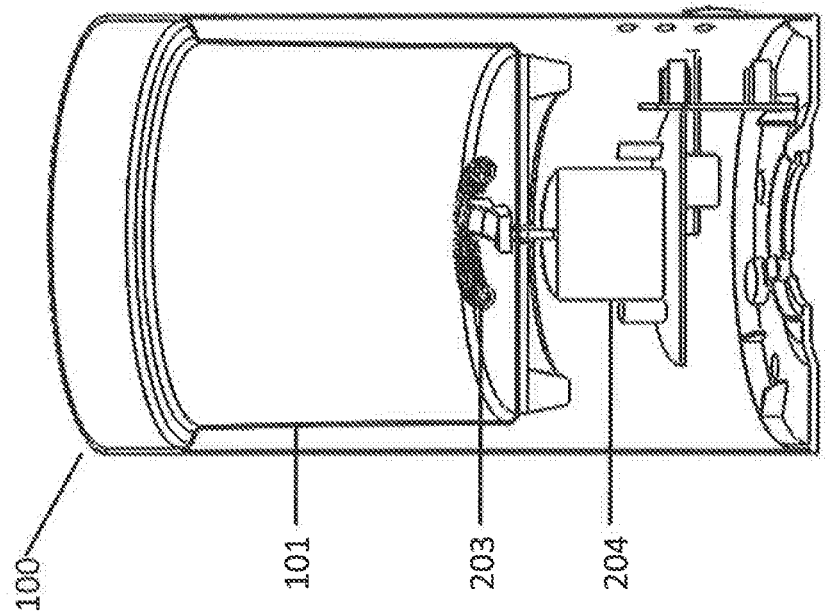

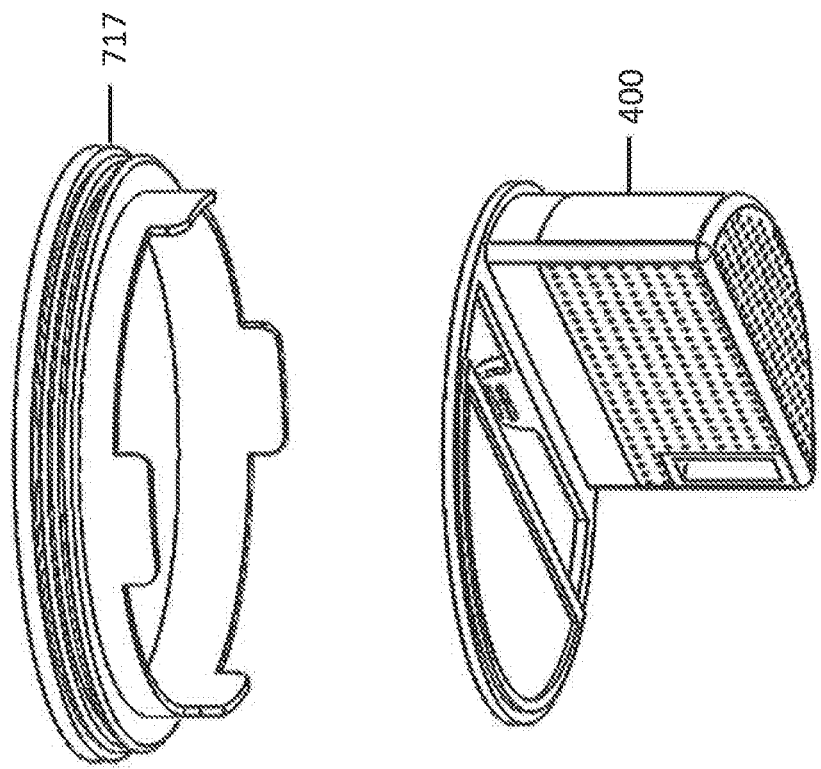

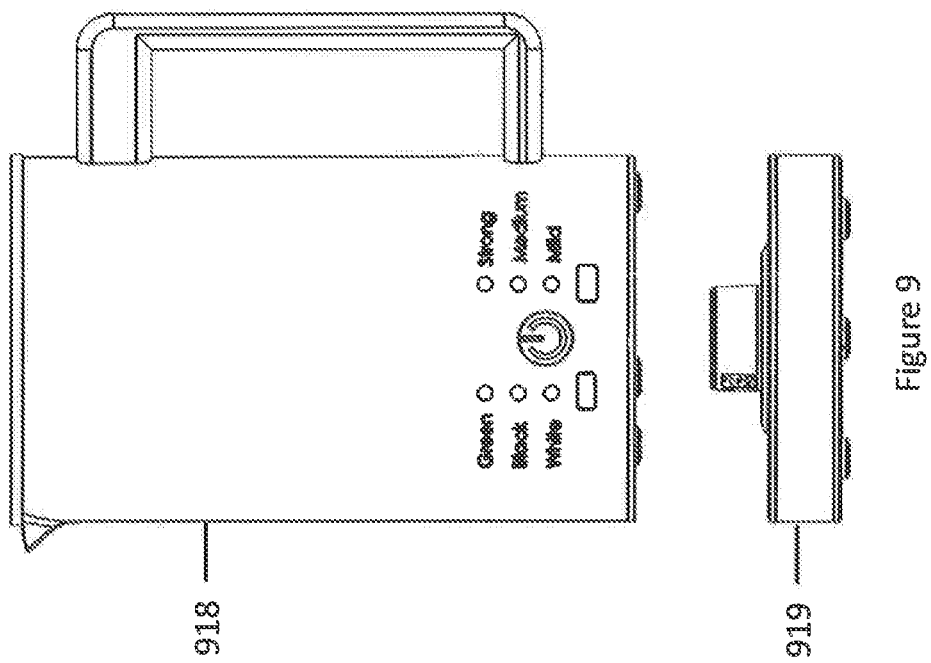

APPLIANCE FOR MAKING BEVERAGES

FIELD OF INVENTION

The invention relates to an appliance for making beverages.

BACKGROUND

There are many types of appliances for making hot drinks such as tea or coffee and soup. There are also appliances for making hot frothed milk for making cappuccino coffee. One type of these comprises a cup shaped container with a heating element arranged to heat the bottom of the container and a rotating whisk to stir and whisk the milk.

Tea makers have to provide a system to remove the tea leaves from the drink once the tea has brewed. Failure to do this will result in too much of the tannin from the tea leaves in the tea spoiling the taste. Tea makers already on the market achieve this by providing a wire mesh basket in which to put the tea leaves. The basket can move vertically so that it can be raised above the water once the tea has brewed. The basket can be moved manually or more conveniently automatically.

There are many different types of coffee makers. Espresso coffee machines force water through the ground coffee at high pressure typically 8-15 bar. However good coffee can be made without resorting to these high pressures. For example those machines which use proprietary pod systems operate at significantly lower pressure and drip type coffee makers have only the pressure of a few centimetres of water to create the flow of water through the ground coffee.

There are appliances for making soup which are similar to the milk frothers in that they have a container with a heated base and a rotating device for cutting the ingredients and stirring the soup. A very similar device can make soya milk.

As will be appreciated a householder wishing to make tea, coffee, frothed milk, soup and soya milk could require five separate appliances.

SUMMARY OF INVENTION

According to the present invention, there is provided an appliance for making beverages that comprises a container for water or another liquid and means for creating a rotational movement of the liquid. A brewing chamber is mounted between a normal level of the liquid, when the means for creating a rotational movement is not rotating, and a raised level of the liquid, when the means for creating a rotational movement is rotating, so that the liquid flows into the brewing chamber when the means for creating a rotational movement is rotating above a predetermined speed.

Preferably, the means for creating a rotational movement of a liquid is arranged to raise a liquid level at outside portions of the container, or by means of a pump.

Preferably the appliance comprises a heater attached to a base of the container, or a base of the container comprises a thick film heating element.

Preferably the means for creating a rotational movement is an impeller, a whisk, a cutting blade. The impeller may be a pump impeller.

Advantageously, the invention may provide an appliance which can provide multiple beverage making functions.

BRIEF DESCRIPTION OF DRAWINGS

Embodiments of the invention will now be described with reference to the accompanying drawings, in which:

FIG. 2A is a cross-sectional diagram showing a rotating member of the appliance.

FIG. 2B is an enlargement of a portion of FIG. 2A.

FIG. 8 is a diagram showing the lid in combination with the brewing chamber.

FIG. 9 is a diagram showing the appliance lifted from a cordless base.

DETAILED DESCRIPTION

Figure 1B:
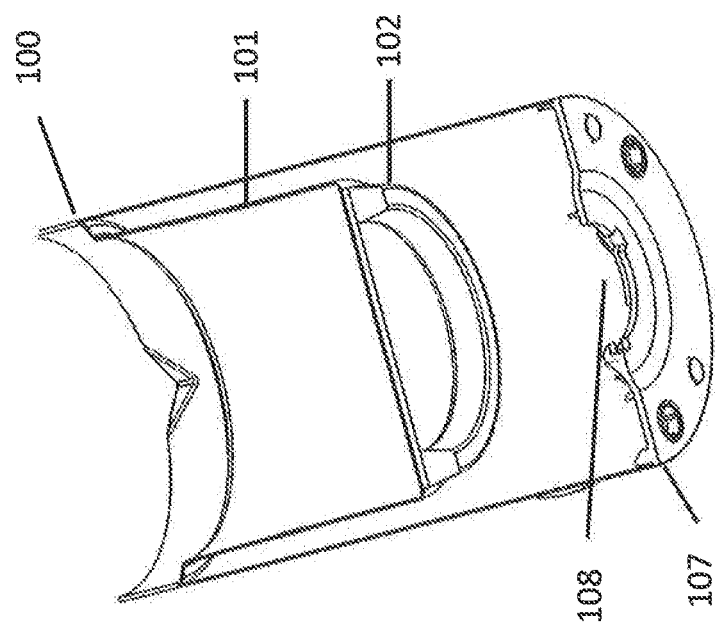
FIGS. 1A and 1B are cross-sectional diagrams showing the container and heated base of the appliance in a first embodiment.
Figure 1A:
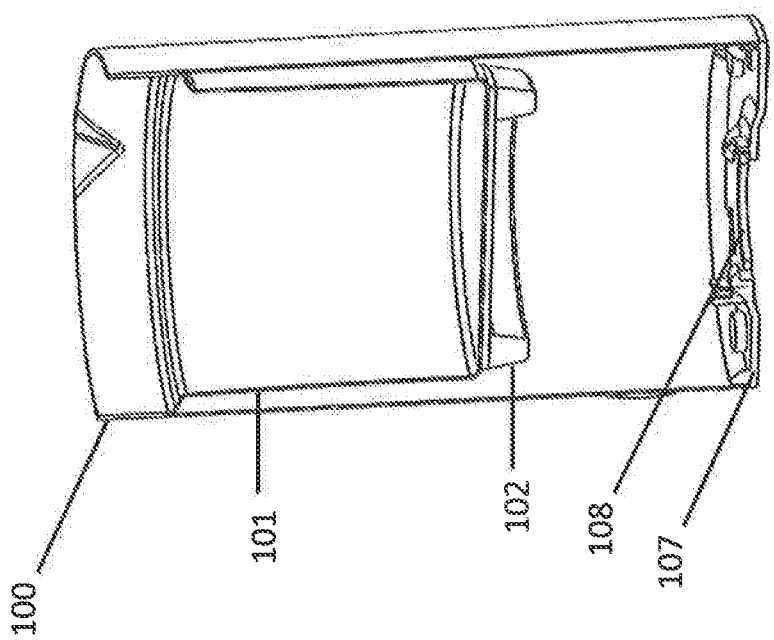

FIGS. 1A and 1B are cross-sectional diagrams of a first embodiment of the invention, comprising an appliance for preparing tea, coffee, frothed milk, soup, soya milk, or similar beverages. It comprises a housing 100 and a container 101 for the liquid (such as water or milk) which has a heated base 102. The heated base may comprise a thick film heater, a tubular type heater, or any other suitable heating means. If the heater is of the thick film variety it can be welded into the container 101 as disclosed in patents EP2033492B and CN200990699Y. Alternatively the heater could be of the tubular type with an aluminium sheath brazed either directly to the bottom of the container 101 or brazed to an intermediate diffuser plate which in turn is brazed to the bottom of the container 101.

The appliance may be a cordless appliance having a cordless connector (not shown) that fits within an aperture 108 in the base 107 of the housing. The cordless connector is connectable to a cordless base (not shown) to provide electrical power to the heater and other electrical components within the appliance. The cordless connector may be a waterproof cordless connector, for example as disclosed in WO 2008/012506 A1.

FIG. 2A is a cross-sectional diagram showing how a rotating member or impeller 203 of the appliance 200 is arranged to rotate about a vertical axis at the bottom of the container 101 thereby creating a rotational movement of liquid in the container. In one arrangement this is driven by an electric motor 204 mounted within the housing 100 below the container 101, in which case the shaft which drives the rotating member 203 passes vertically upwards through the bottom of the container 101 and is suitably sealed to prevent leakage of the liquid. Alternatively the rotating member 203 can be driven by a magnetic coupling eliminating the need for the seal. FIG. 2B is an enlargement of a portion 220 of the cross-sectional diagram showing the rotating member 203 and electric motor 204. In another alternative, the electric motor 204 may be mounted above the container 101 and the shaft passes vertically downwards to drive the rotating member 203.

If the appliance is used to prepare frothed milk the rotating member 203 may comprise a whisk. The whisk may be a coiled or helical spring formed into a toroidal shape. For soup the rotating member 203 may comprise a rotating cutter like that found in a motorised food processor. If the appliance is used as a tea maker the rotating member 203 is used as the impeller of a centrifugal type pump. If a beverage requires the liquid to be delivered to the brewing chamber at a higher pressure, for example when coffee is made using a coffee pod, the rotating member may comprise an impeller of a pump. The pump is driven by the motor using the same drive.

Figure 3B:
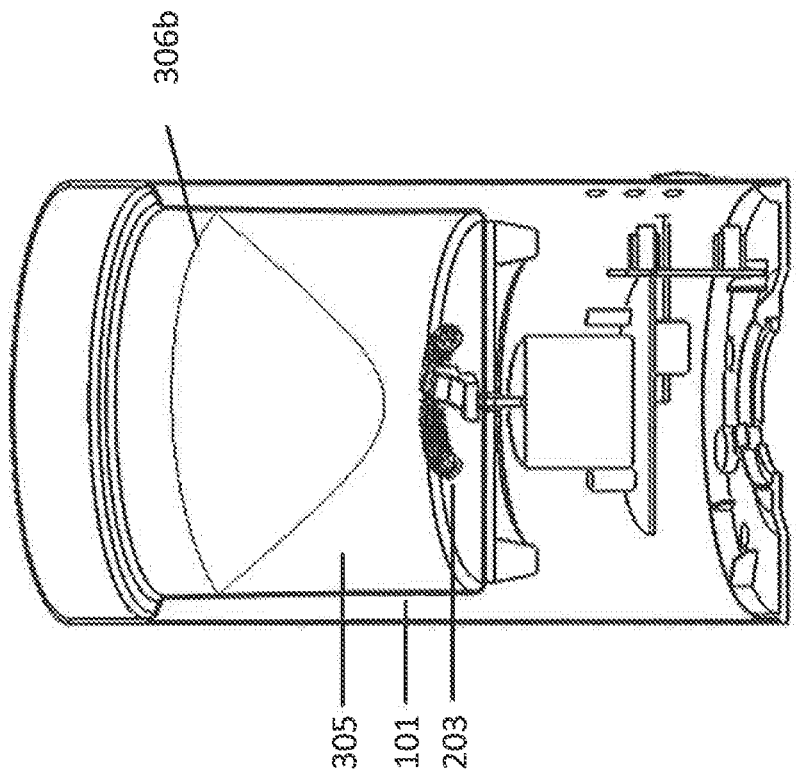
FIG. 3B is a diagram showing the container of the appliance filled with a liquid in a rotating state.
Figure 3A:
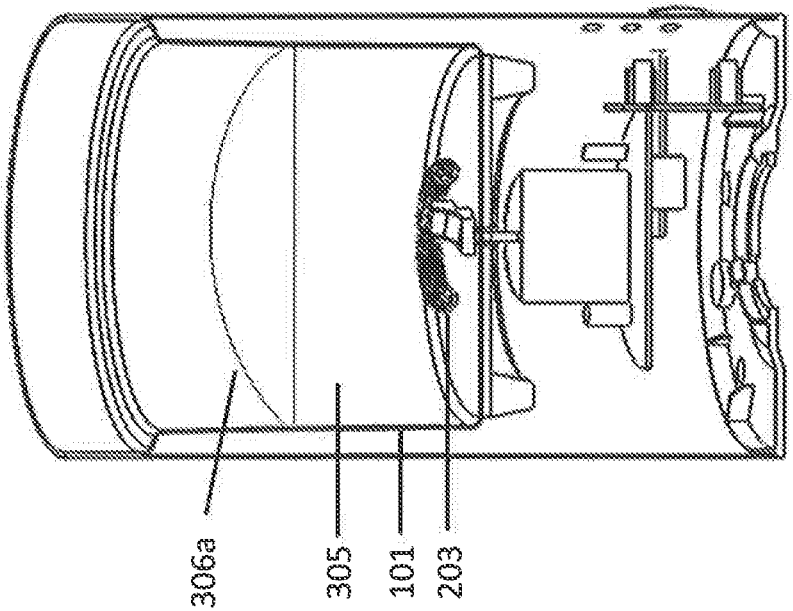
FIG. 3A is a diagram showing the container of the appliance filled with a liquid in a stationary state.

FIG. 3A shows the container 101 filled with a liquid 305 in a stationary state in which the rotating member 203 is not rotating. The level of the liquid 305 in the container 101 is at a first height 306a. As shown in FIG. 3B, when the rotating member 203, and hence the liquid, rotates the level of the liquid region of the container furthest from the axis of the impeller will be raised to a second height 306b and the level nearest the axis will be lowered. The second height 306b, when the liquid 305 is rotating, is higher in the container 101 than the first height 306a when the liquid is stationary. This effect can be used to make the liquid enter into a brewing chamber into which the tea or coffee is placed, as described subsequently.

Figure 4:
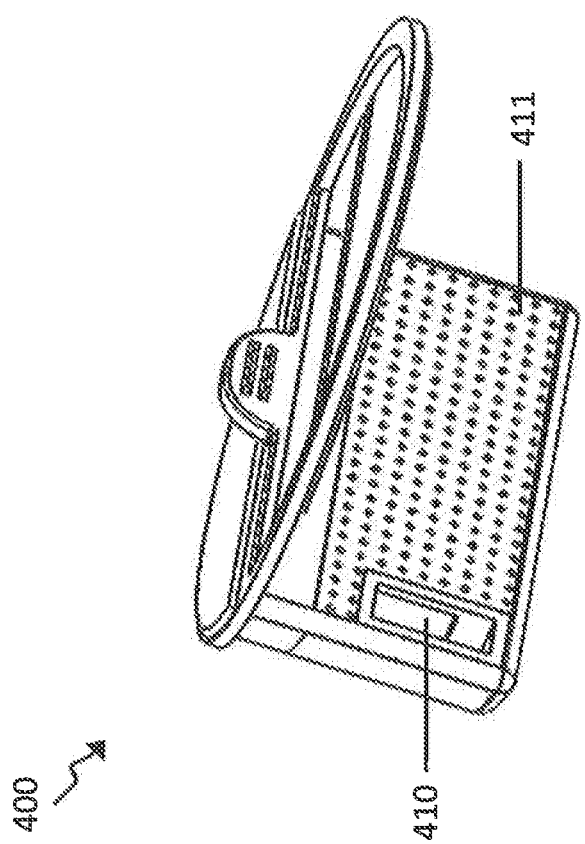
FIG. 4 is a diagram of the brewing chamber.

FIG. 4 shows a diagram of the brewing chamber 400. In one arrangement of the brewing chamber it is a segment of a circle with the diameter the same or slightly smaller than the diameter of the container. It is mounted towards the top of the container 101 so that the floor of the chamber is higher than the first height 306a in the container 101. There is an opening 410 at or towards an outer portion, facing towards the direction of flow of the liquid, on a corner of the chamber to allow the water in and perforations 411 in the bottom and walls of the chamber 400 to allow the brewing tea to flow out.

Figure 5:
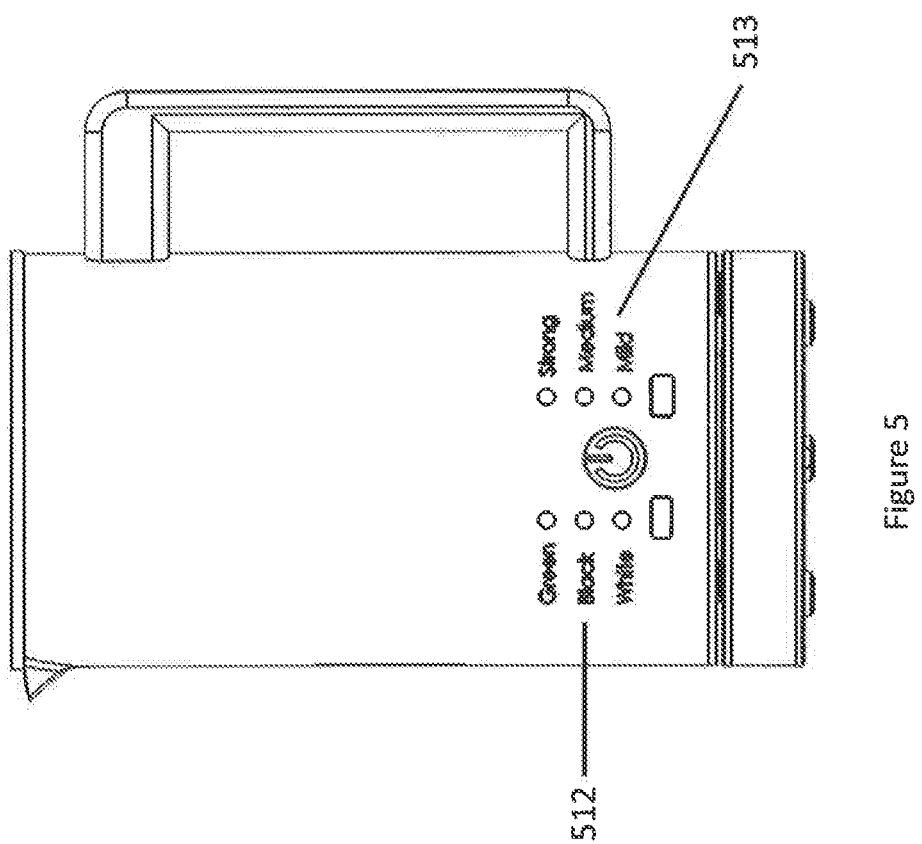
FIG. 5 is a diagram of the appliance showing the user-operable means.

To brew tea, for example, the container 101 is filled with water up to a maximum fill level which could be indicated by a mark on the inside wall of the container. Tea is placed in the brewing chamber 400 which is secured in the top portion of the container 101. The brewing chamber 400 can be removed for cleaning or when the user wishes to use the appliance for making frothed milk or other beverages for which the chamber is not required. When the brewing cycle starts the heater is energised but the motor driving the impeller remains off until the water reaches a desired temperature. This temperature can be varied, if desired depending on the type of tea, or other beverage being made through user-operable means 512, such as selection buttons for each type of tea, as shown in FIG. 5. For example green tea would be best made with water in the region of 85° C. while black tea would be made with water at or close to the boiling point. When the water reaches the desired temperature the motor is energised rotating the stirrer which in turn rotates the water in the container, raising the level towards the outside of the container causing the water to flow into the brewing chamber. The partially brewed tea then flows back out of the chamber allowing more water to flow into the chamber. The tea will brew to the desired strength, and a motor controller will instruct the motor to stop at the expiration of a timer set to a predetermined brewing time. The length of brewing time can be varied, by the user, by adjusting the timer 513 associated to the controller of the rotating member to produce tea of the desired strength.

The level of the now brewed tea will stabilize at a level below the brewing chamber thus separating the tea from the tea leaves. This prevents the spoiling of the tea due to excessive tannin as described earlier.

If the user wishes to make frothed milk the brewing chamber can be removed and the impeller replaced by a whisk.

Figure 6:
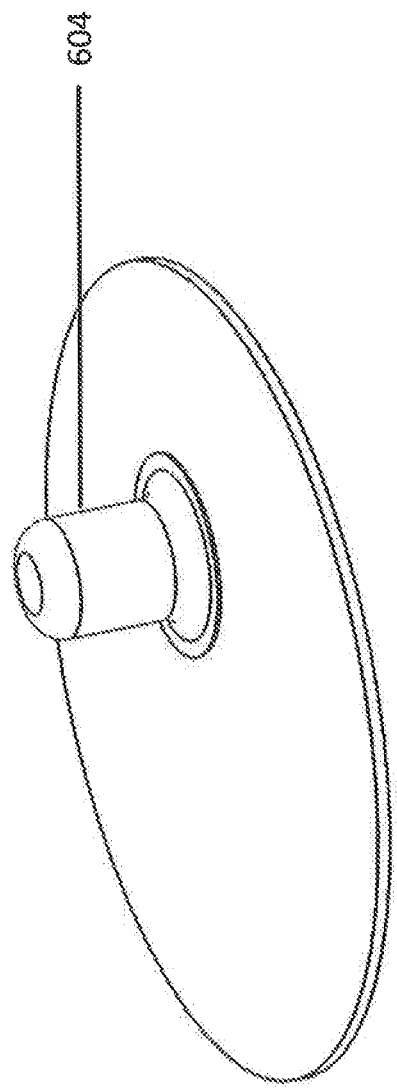
FIG. 6 is a diagram showing the rotating member being arranged eccentric to the container.

In one arrangement, as shown in FIG. 6, the axis of the motor 604 and hence the rotating member may advantageously be positioned eccentric to the container, i.e. not positioned centrally in a horizontal cross-section of the container, to increase the shearing action of the whisk on the liquid. This will also reduce the rotation of the liquid in the container. The increase in shearing action is especially advantageous when making frothed milk; provided the eccentricity is not excessive the liquid rotation can be enough to promote tea brewing performance. Alternatively the axis of the motor can be concentric with the container, i.e. positioned centrally in a horizontal cross-section of the container, and when the brewing chamber is removed a baffle can be inserted to optimise the flow and shearing action for making frothed milk.

Figure 7:
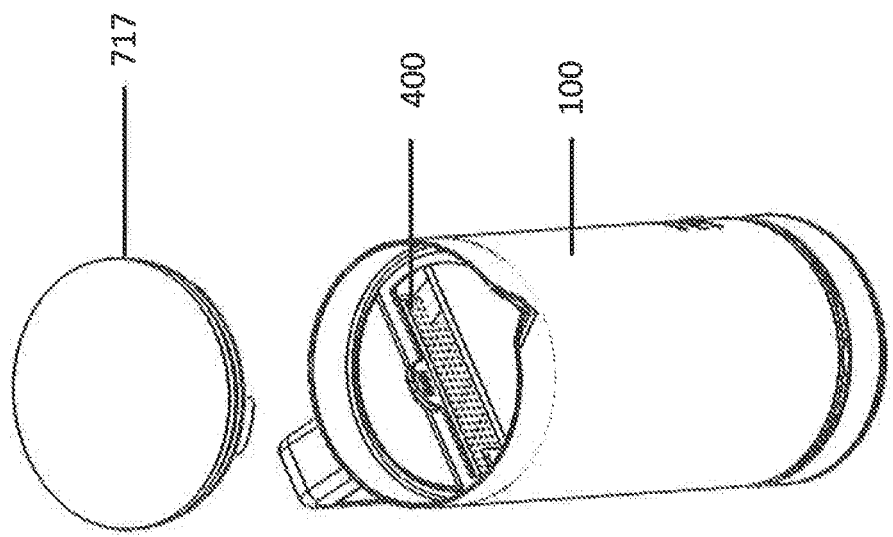
FIG. 7 is a diagram of the appliance with the lid removed.

FIG. 7 shows a diagram of the appliance with the lid 717 removed. The brewing chamber 400 is positioned substantially at the top of the container 101. FIG. 8 shows the lid 717 in combination with the brewing chamber 400 according to the first embodiment. FIG. 9 shows the appliance 918 lifted from a cordless base 919. The cordless base 919 is operable to provide power to the appliance 918.

Figure 10B:
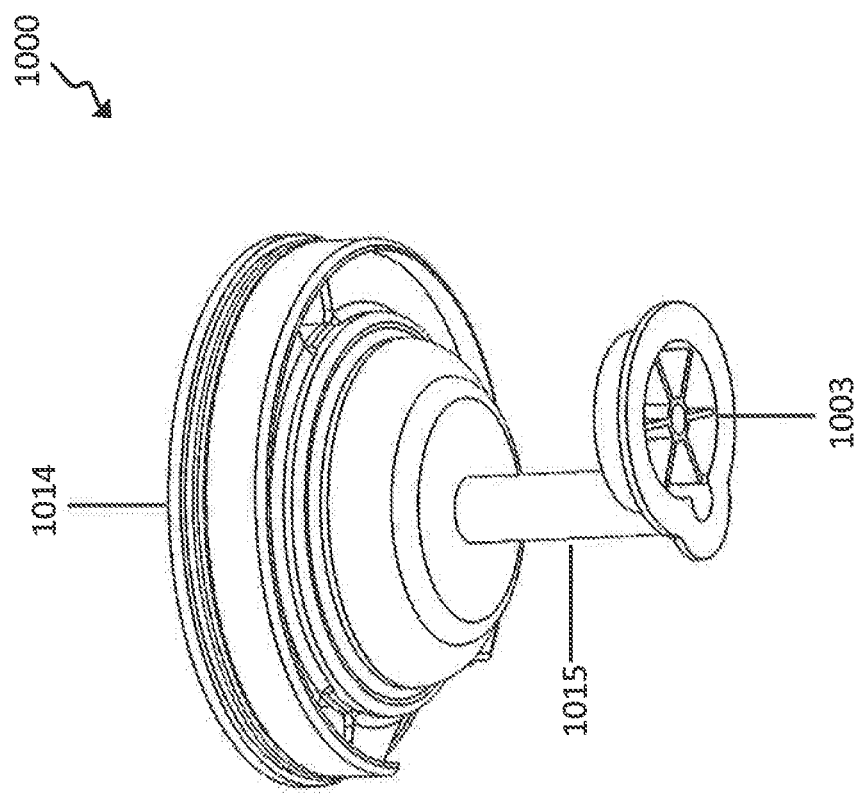
FIGS. 10A and 10B are diagrams showing a rotating member and impeller in a second embodiment.
Figure 10A:
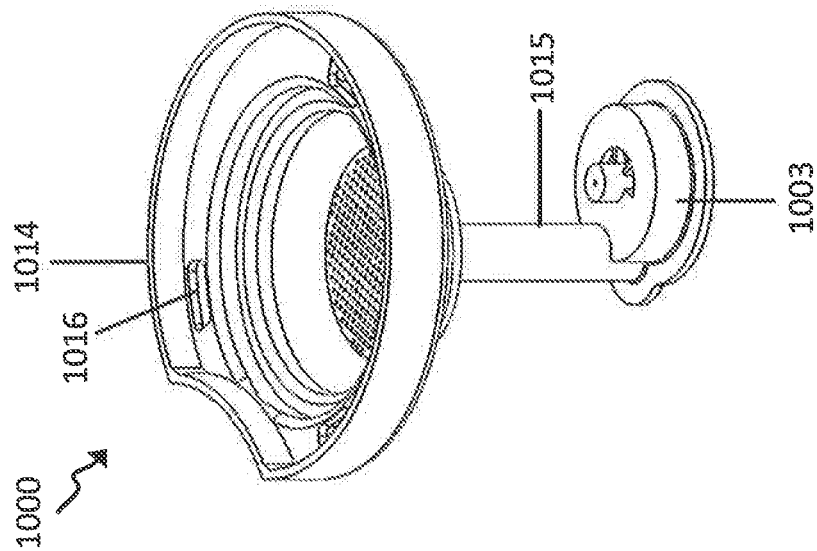

FIGS. 10A and 10B shows a removable insert 1000 for the container 101 in a second embodiment, comprising a brewing chamber 1014 connected by a vertical pipe 1015 to a pump 1003 including an impeller which is driven by a motor as in the first embodiment. The pump 1003 pumps the liquid upwards through the vertical pipe 1015 into the brewing chamber 1014, where the liquid passes through a beverage ingredient and falls back into the container 101 through apertures 1016 around the rim of the brewing chamber 1014.

What is claimed is:
1. An appliance for making beverages, comprising:
a container for containing a liquid, the container having a heated base for heating the liquid;
a rotator for creating a rotational movement of the liquid in the container so as to raise a level of the liquid at an outer portion of the container; and
a brewing chamber secured in a top portion of the container above a first level, so that the liquid flows into the brewing chamber when the rotator is rotating above a predetermined speed so as to raise the liquid above the first level;
wherein the brewing chamber includes a floor and a sidewall, and has an opening positioned in the sidewall at said outer portion facing in a horizontal, substantially circumferential direction towards the direction of rotational movement of the liquid to allow the liquid to flow into the brewing chamber, and comprises perforations to allow the liquid to flow out of the brewing chamber.

2. The appliance of claim 1, wherein the heated base comprises a heater attached to a base of the container.

3. The appliance of claim 1, wherein the heated base is arranged to heat liquid in the container to a predefined temperature and the rotator is arranged to be activated after the predefined temperature has been reached.

4. The appliance of claim 1, wherein the heated base comprises a thick film heating element.

5. The appliance of claim 1, wherein the rotator is removable from the container.

6. The appliance of claim 5, wherein the rotator is an impeller.

7. The appliance of claim 5, wherein the rotator is a stirrer.

8. The appliance of claim 1, wherein the brewing chamber is a segment of a circle with a diameter the same as or slightly smaller than a diameter of the container.

9. The appliance of claim 1, wherein the brewing chamber is removable from the container.

10. The appliance of claim 9, including a baffle removably insertable in the container when the brewing chamber is removed from the container, to promote frothing of the liquid for producing frothed milk or similar.

11. The appliance of claim 1, wherein the rotator is positioned eccentric to the container.

12. The appliance of claim 1, wherein the rotator is operated by a timer.

13. The appliance of claim 12, wherein the timer has one or more predetermined time settings.

14. The appliance of claim 1, wherein the rotator is positioned concentric to the container.

15. A method of making a beverage comprising:
   a. providing an appliance for making beverages, the appliance comprising a container having a heated base, a rotator for creating a rotational movement of the liquid in the container, and a brewing chamber mounted above a first level in the container, the brewing chamber including a floor and a sidewall and having an opening positioned in the sidewall at an outer portion of the container facing in a horizontal, substantially circumferential direction towards the direction of rotational movement of the liquid to allow the liquid to flow into the brewing chamber, and perforations to allow the liquid to flow out of the brewing chamber;
   b. providing a liquid to the first level in the container; and
   c. rotating the rotator above a predetermined speed so that the level of the liquid in the container rises above the first level at the outer portion of the container and the liquid flows into the brewing chamber.

16. The method of claim 15, wherein the brewing chamber is secured in a top portion of the container.

17. The method of claim 15, comprising: heating the liquid to a predetermined temperature before rotating the rotator above the predetermined speed.

18. The appliance of claim 5, including a whisk suitable for frothing milk or similar, for replacing the rotator.

19. The appliance of claim 5, including a cutting blade suitable for making soup or similar, for replacing the rotator.

* * * * *